(12) United States Patent
Himori et al.

(10) Patent No.: US 11,352,450 B2
(45) Date of Patent: Jun. 7, 2022

(54) PHOTOPOLYMERIZATION SENSITIZER COMPOSITION

(71) Applicant: Kawasaki Kasei Chemicals Ltd., Kawasaki (JP)

(72) Inventors: Shunichi Himori, Kawasaki (JP); Keita Iuchi, Kawasaki (JP)

(73) Assignee: Kawasaki Kasei Chemicals Ltd., Kawasaki (JP)

( * ) Notice: Subject to any disclaimer, the term of this patent is extended or adjusted under 35 U.S.C. 154(b) by 51 days.

(21) Appl. No.: 17/049,113

(22) PCT Filed: Apr. 16, 2019

(86) PCT No.: PCT/JP2019/016272
§ 371 (c)(1),
(2) Date: Oct. 20, 2020

(87) PCT Pub. No.: WO2019/208321
PCT Pub. Date: Oct. 31, 2019

(65) Prior Publication Data
US 2021/0079127 A1    Mar. 18, 2021

(30) Foreign Application Priority Data
Apr. 25, 2018 (JP) .................. JP2018-084273

(51) Int. Cl.
*C08F 2/50* (2006.01)
*C08F 20/16* (2006.01)

(52) U.S. Cl.
CPC .............. *C08F 2/50* (2013.01); *C08F 20/16* (2013.01)

(58) Field of Classification Search
CPC ........ C08F 2/50; C08F 20/16; C08F 22/1006; C08F 2/44; C08G 59/68; C08L 101/00; C09K 3/00; C08K 5/17; G03F 7/004; G03F 7/0045
See application file for complete search history.

(56) References Cited

U.S. PATENT DOCUMENTS

| | | | |
|---|---|---|---|
| 4,945,027 A | 7/1990 | Wilczak | |
| 6,531,521 B2 * | 3/2003 | Baba ........ | G03F 7/031 522/6 |
| 11,149,103 B2 * | 10/2021 | Numata ........ | C08F 2/50 |
| 2002/0022186 A1 * | 2/2002 | Takebe ........ | G03F 7/0007 430/7 |
| 2002/0025992 A1 * | 2/2002 | Baba ........ | C07B 63/00 522/63 |
| 2002/0136968 A1 * | 9/2002 | Takebe ........ | C08G 65/18 430/7 |
| 2009/0027608 A1 * | 1/2009 | Nakamura ........ | G03F 7/033 349/155 |
| 2010/0222449 A1 * | 9/2010 | Noda ........ | C08L 101/10 522/99 |
| 2010/0279850 A1 * | 11/2010 | Lombardi ........ | B01J 35/004 502/158 |
| 2011/0028585 A1 * | 2/2011 | Shiraishi ........ | G03F 7/0045 522/63 |
| 2012/0232240 A1 * | 9/2012 | Hyodo ........ | C07C 39/15 528/94 |
| 2017/0123120 A1 * | 5/2017 | Shirouchi ........ | G02F 1/133516 |
| 2017/0227846 A1 * | 8/2017 | Zheng ........ | G03F 7/40 |
| 2019/0270919 A1 * | 9/2019 | Yoshiwara ........ | C08J 3/24 |
| 2021/0116806 A1 * | 4/2021 | Morimoto ........ | C07D 277/42 |

FOREIGN PATENT DOCUMENTS

| | | | |
|---|---|---|---|
| CN | 108319111 A | * | 7/2018 |
| JP | 1-164938 A | | 6/1989 |
| JP | 4-195043 A | | 7/1992 |
| JP | 6-59380 A | | 3/1994 |
| JP | 11-140110 A | | 5/1999 |
| JP | 11-279212 A | | 10/1999 |
| JP | 2001-106648 A | | 4/2001 |
| JP | 2006-234943 A | | 9/2006 |
| JP | 2007-39475 A | | 2/2007 |

(Continued)

OTHER PUBLICATIONS

International Search Report dated Jul. 23, 2019 in PCT/JP2019/016272 filed Apr. 16, 2019, 2 pages.

*Primary Examiner* — Sanza L. McClendon
(74) *Attorney, Agent, or Firm* — Oblon, McClelland, Maier & Neustadt, L.L.P.

(57) ABSTRACT

The purpose of the present invention is to provide a photopolymerizable composition which can act as a photopolymerization sensitizer that is active against light having a wavelength falling within a wavelength range of from 300 to 500 nm, and which has such a property that coloring of a cured product produced by polymerizing a photopolymerizable composition containing the photopolymerization sensitizer is less.

A photopolymerization sensitizer composition characterized by comprising a photopolymerization sensitizer containing an alkoxyanthracene compound represented by the formula (1) and a singlet oxygen quencher; and a photopolymerizable composition containing the photopolymerization sensitizer composition:

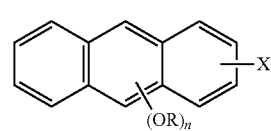

(1)

in the formula (1), n represents an integer of 1 or 2; R represents a $C_{1-12}$ alkyl group; and X represents a hydrogen atom or a $C_{1-8}$ alkyl group.

12 Claims, No Drawings

(56) References Cited

FOREIGN PATENT DOCUMENTS

| | | | | |
|---|---|---|---|---|
| JP | 2007-99637 | A | | 4/2007 |
| JP | 2007099637 | A | * | 4/2007 |
| JP | 2007-204438 | A | | 8/2007 |
| JP | 2007204438 | A | * | 8/2007 |
| JP | 2011-99047 | A | | 5/2011 |
| JP | 2011-190333 | A | | 9/2011 |
| JP | 2012-155243 | A | | 8/2012 |
| JP | 2012193378 | A | * | 10/2012 |
| JP | 2014-101442 | A | | 6/2014 |
| JP | 2014101442 | A | * | 6/2014 |
| JP | 2015127381 | A | * | 7/2015 |
| JP | 2015183137 | A | * | 10/2015 |
| JP | 2015183139 | A | * | 10/2015 |
| JP | 2016-40593 | A | | 3/2016 |
| JP | 2017101442 | A | * | 6/2017 |
| JP | 2018-193538 | A | | 12/2018 |
| TW | 200626631 | A | | 8/2006 |
| WO | WO 2006/073021 | A1 | | 7/2006 |
| WO | WO-2017188192 | A1 | * | 11/2017 ........ C08F 122/1006 |

\* cited by examiner

PHOTOPOLYMERIZATION SENSITIZER COMPOSITION

TECHNICAL FIELD

The present invention relates to a photopolymerization sensitizer composition, particularly to a photopolymerization sensitizer composition containing an alkoxyanthracene compound as a photopolymerization sensitizer.

BACKGROUND ART

At present, photocurable resins are widely used in the fields of coatings, inks, electronic materials, etc. A photocurable resin is obtainable by polymerizing and curing a photopolymerizable composition by irradiating it with light such as ultraviolet rays or electron beams. This technique for curing with light is used in various applications, e.g. woodworking paint, coating materials for e.g. metals, inks for screen printing or offset printing, dry film resists to be used for electronic substrates, hologram materials, sealants, overcoat materials, resins for stereolithography, adhesives, etc.

And, this photopolymerizable composition is composed mainly of a photopolymerizable compound, a photopolymerization initiator to initiate polymerization of the photopolymerizable compound by irradiation with energy, and, in many cases, a photopolymerization sensitizer to activate the photopolymerization initiator. Industrially, a photopolymerizable composition capable of performing photocationic polymerization, photoradical polymerization, or photohybridization using them in combination, is used in many cases.

The photopolymerization sensitizer to be used in such a photopolymerizable composition is usually used in a case where by a photopolymerization initiator alone, polymerization by the energy ray is insufficient, or in order to let the polymerization proceed more efficiently.

A photopolymerization sensitizer is often used in a case where the absorption wavelength of a photopolymerization initiator is likely to be blocked by fillers such as a dye, a pigment, a stabilizer, etc. contained in the photopolymerizable composition, or in a case where the absorption wavelength of the photopolymerization initiator does not match with the wavelength of the energy ray (light) to be used for the polymerization. Particularly in photocationic polymerization, the photocationic polymerization initiator has a light absorption wavelength of around 365 nm or less in many cases, and the polymerization did not proceed sufficiently by light irradiation in a relatively long wavelength region of e.g. about 400 nm.

Among radical polymerization initiators, also in the case of environment-friendly benzyl methyl ketal-type or α-hydroxyalkylphenone-type radical polymerization initiators containing no phosphorus atoms or nitrogen atoms, due to their absorption wavelength, a high-pressure mercury lamp is mainly used as the light irradiation source, and there has been a problem that polymerization does not proceed sufficiently by a metal halide lamp or a gallium-doped lamp containing light of longer wavelengths.

In such a case, by using photopolymerization sensitizers having light absorption on the relatively long wavelength side (in this case, in the vicinity of 400 nm), it becomes possible to let the polymerization proceed efficiently. As such photopolymerization sensitizers, for example, dialkoxyanthracenes, thioxanthones, etc. are known (Patent Documents 1 to 4, etc.). On the other hand, although these photopolymerization sensitizers having light absorption in the vicinity of 400 nm exhibit the above-mentioned sensitizing effect, coloring has been often observed in cured products, and therefore, it has been difficult to use them for optical applications or display materials in particular. As photopolymerization sensitizers capable of reducing such coloring, for example, diacylanthracenes (Patent Documents 5 and 6), diacyloxyanthracenes (Patent Document 7), etc. have been proposed, but there has been a problem that they are sometimes slightly inferior in sensitivity to dialkoxyanthracenes.

On the other hand, the present invention is one which uses a singlet oxygen quencher together with an alkoxyanthracene compound, but an example using dimethoxyanthracene as a singlet oxygen quencher is known. For example, when an active oxygen quencher (singlet oxygen quencher) is added in order to prevent deterioration of the surface of an electrophotographic photosensitive member due to active oxygen (singlet oxygen), a nickel complex or the like is used as such a singlet oxygen quencher, but, it is said that dimethoxyanthracene, 9,10-bis(4-methoxyphenyl)anthracene, 9,10-diphenylanthracene or the like may also be used as a singlet oxygen quencher (Patent Document 8). Further, in order to prevent discoloration of a coloring composition of the color filter, an antioxidant or a singlet oxygen quencher is used. As an example of the singlet oxygen quencher, dimethoxyanthracene, or 9,10-bis(4-methoxyphenyl)anthracene, 9,10-diphenylanthracene or the like, is mentioned (Patent Document 9).

Further, Patent Document 10 discloses that in the synthesis of a color filter obtained by curing a colored curable resin composition, in order to improve the stability of the colored curable composition, an antioxidant may be contained. As the antioxidant, for example, a radical scavenger, a peroxide decomposer, an ultraviolet absorber, a singlet oxygen quencher or the like is mentioned. And, as examples of the singlet oxygen quencher, ethylenic compounds such as tetramethylethylene and cyclopentene; amines such as diethylamine, triethylamine, 1,4-diazabicyclooctane (DABCO) and N-ethylimidazole; condensed polycyclic aromatic compounds such as naphthalene, dimethylnaphthalene, dimethoxyanthracene, anthracene and diphenylanthracene which may be substituted; and aromatic compounds such as 1,3-diphenylisobenzofuran, 1,2,3,4-tetraphenyl-1,3-cyclopentadiene and pentaphenylcyclopentadiene, are uniformly listed in parallel. Further, in this Document, it is disclosed that the colored curable composition of the present invention may further contain various additives such as a filler, an ultraviolet absorber, an anticoagulant, a photosensitizer, a light stabilizer, etc., as the case requires, and, as examples of the photosensitizer, specifically, pyrene, perylene, acridine, thioxanthone, 2-chlorothioxanthone, benzoflavin, N-vinylcarbazole, 9,10-dibutoxyanthracene, anthraquinone, benzophenone, coumarin, ketocoumarin, phenanthrene, camphorquinone, phenothiazine derivatives, etc. are listed in parallel, and among them, 9,10-dibutoxyanthracene is also mentioned. However, a singlet oxygen quencher and a photosensitizer are compounds that may be added as the case requires, and no specific example in which both are added, is described. Further, in Examples, no Example is described in which a singlet oxygen quencher or a photosensitizer is added. Furthermore, there is no description concerning the problem of coloring by a photosensitizer, and there is no description that a singlet oxygen quencher is necessary to suppress the coloring. It is said that a singlet oxygen quencher may be used as one of antioxidants used to stabilize the color properties of triarylmethane dyes as colorants for color filters. Further, for example, as seen in Patent Document 11, in a case where an organic dye or the like is similarly used, there is an example in which a singlet oxygen quencher is used to prevent its discoloration.

PRIOR ART DOCUMENTS

Patent Documents

Patent Document 1: JP-A-H06-059380
Patent Document 2: JP-A-H11-279212
Patent Document 3: JP-A-H11-140110
Patent Document 4: JP-A-2001-106648
Patent Document 5: JP-A-2007-99637
Patent Document 6: JP-A-2007-204438
Patent Document 7: JP-A-2014-101442
Patent Document 8: JP-A-2006-234943
Patent Document 9: JP-A-2012-155243
Patent Document 10: JP-A-2016-40593
Patent Document 11: JP-A-2011-99047

DISCLOSURE OF INVENTION

Technical Problem

The alkoxyanthracene compound used as a photopolymerization sensitizer is a very active photopolymerization sensitizer in a case where it is cured by light in a long wavelength region. That is, it can be excited by the irradiated light and the excitation energy can be efficiently transmitted to the photopolymerization initiator. However, as a result of diligent examination of the reactivity of the anthracene compound, the present inventors have found that the alkoxyanthracene compound in the excited state simultaneously excites oxygen molecules present in a small amount in the system to generate singlet oxygen. And, they have found that the generated singlet oxygen and the alkoxyanthracene compound react with each other. That is, they have found that the cause for the coloring of the alkoxyanthracene compound used as a photopolymerization sensitizer is that the alkoxyanthracene compound is excited by light irradiation, and the excited species will convert oxygen in the ground state into singlet oxygen, and the singlet oxygen will react with the alkoxyanthracene compound, so that the alkoxyanthracene compound will be decomposed into a colored product via an endoperoxide intermediate, and they have found that, as a measure for preventing the coloring, a singlet oxygen quencher is allowed to coexist with the alkoxyanthracene compound, to prevent the reaction of the singlet oxygen with the alkoxyanthracene compound, whereby it is possible to prevent the decomposition and coloring of the alkoxyanthracene compound, and thus have completed the present invention. That is, an object of the present invention is to provide a photopolymerization sensitizer composition that is active to light having a wavelength range of from 300 nm to 500 nm, and a photopolymerizable composition containing the photopolymerization sensitizer composition, so that a cured product obtained by polymerizing the photopolymerizable composition, is less colored.

The decomposition reaction of the alkoxyanthracene compound by the singlet oxygen is not a phenomenon generally occurring in the photopolymerization sensitizer but a phenomenon peculiar in a case where the alkoxyanthracene compound is used as the photopolymerization sensitizer. For example, it is not observed in the case of thioxanthone, ketocoumarin, benzophenone or the like. In the case of a photopolymerization sensitizer, it is necessary to absorb and excite ultraviolet rays having a specific wavelength, and by transferring the excitation energy to the photopolymerization initiator, the initiator is decomposed and polymerization is initiated. However, with some photopolymerization sensitizers, the excitation energy causes a reaction in which oxygen in the ground state is excited to generate singlet oxygen. For example, thioxanthone and alkoxyanthracene compounds have the ability. However, it has been found that in the case of an alkoxyanthracene compound, it reacts with the singlet oxygen generated by itself and decomposes into a colored product via the endoperoxide intermediate. No such reaction occurs with thioxanthone.

Solution to Problem

In order to accomplish the above-mentioned object, a first gist resides in a polymerization sensitizer composition characterized by comprising a photopolymerization sensitizer containing an alkoxyanthracene compound represented by the formula (1) and a singlet oxygen quencher:

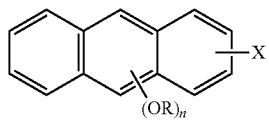

(1)

in the formula (1), n represents an integer of 1 or 2, R represents a $C_{1-12}$ alkyl group, and X represents a hydrogen atom or a $C_{1-8}$ alkyl group.

A second gist resides in a photopolymerization sensitizer composition characterized by comprising a radical polymerization sensitizer containing an alkoxyanthracene compound represented by the formula (2) and a singlet oxygen quencher:

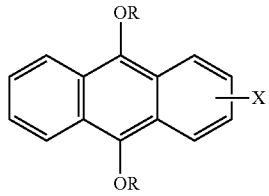

(2)

in the formula (2), R represents a $C_{1-12}$ alkyl group, and X represents a hydrogen atom or a $C_{1-8}$ alkyl group.

A third gist resides in a photopolymerization sensitizer composition characterized by comprising a radical polymerization sensitizer containing an alkoxyanthracene compound represented by the formula (3) and a singlet oxygen quencher:

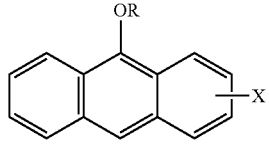

(3)

in the formula (3), R represents a $C_{1-12}$ alkyl group, and X represents a hydrogen atom or a $C_{1-8}$ alkyl group.

A fourth gist resides in the photopolymerization sensitizer composition according to any one of the first gist to the third gist, characterized by further comprising an antioxidant together with the singlet oxygen quencher.

A fifth gist resides in the photopolymerization sensitizer composition according to any one of the first gist to the fourth gist, characterized in that the singlet oxygen quencher is a tertiary amine.

A sixth gist resides in a photopolymerizable composition characterized by comprising the photopolymerization sensitizer composition as defined in any one of the first gist to the fifth gist, a photopolymerization initiator and a polymerizable compound.

A seventh gist resides in the photopolymerizable composition according to the sixth gist, characterized in that a triarylmethane dye is not contained in the photopolymerizable composition.

An eighth gist resides in the photopolymerizable composition according to the sixth or seventh gist, wherein the polymerizable compound is a radical polymerizable compound, and the photopolymerization initiator is a photoradical polymerization initiator.

A ninth gist resides in the photopolymerizable composition according to the sixth or seventh gist, wherein the polymerizable compound is a cationic polymerizable compound, and the photopolymerization initiator is a photocationic polymerization initiator.

A tenth gist resides in the photopolymerizable composition according to the sixth gist or the seventh gist wherein the polymerizable compound contains both a radical polymerizable compound and a cationic polymerizable compound, and the photopolymerization initiator contains both a photoradical polymerization initiator and a photocationic polymerization initiator.

An eleventh gist resides in a photopolymerization method comprising polymerizing the photopolymerizable composition as defined in any one of the sixth gist to the tenth gist by irradiating it with light including light in a wavelength range of from 300 nm to 500 nm.

A twelfth gist resides in the photopolymerization method according to the eleventh gist, characterized in that an irradiation source of light including light in a wavelength range of from 300 nm to 500 nm is an ultraviolet LED having a central wavelength of 365 nm, 375 nm, 385 nm, 395 nm or 405 nm, or a 405 nm semiconductor laser.

Advantageous Effects of Invention

The photopolymerization sensitizer composition comprising a photopolymerization sensitizer containing an alkoxyanthracene compound represented by the formula (1) and a singlet oxygen quencher, of the present invention, is useful as a radical polymerization sensitizer composition that is sensitive to light in a wavelength range of from 300 nm to 500 nm and that activates a radical polymerization initiator. Further, the photopolymerization sensitizer composition of the present invention is capable of suppressing formation of a colored decomposition product derived from the alkoxyanthracene compound represented by the formula (1) by light irradiation and capable of suppressing coloring of a cured product obtained by polymerizing a photopolymerizable composition containing the photopolymerization sensitizer composition.

The objects, characteristics and advantages of the present invention will become more apparent by the following detailed description.

DESCRIPTION OF EMBODIMENTS

In the following, the present invention will be described in detail.

(Alkoxyanthracene Compound)

The present invention relates to an alkoxyanthracene compound represented by the following formula (1):

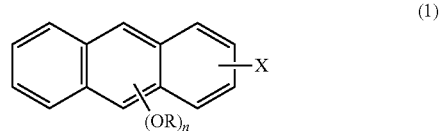

in the formula (1), n represents an integer of 1 or 2, R represents a $C_{1-12}$ alkyl group, and X represents a hydrogen atom or a $C_{1-8}$ alkyl group.

In the formula (1), when n=2, it becomes to be a 9,10-dialkoxyanthracene compound represented by the following formula (2):

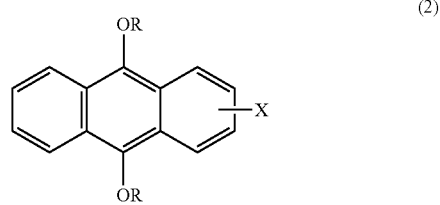

in the formula (2), R represents a $C_{1-12}$ alkyl group, and X represents a hydrogen atom or a $C_{1-8}$ alkyl group.

Further, in the formula (1), when n=1, it becomes to be a 9-alkoxyanthracene compound represented by the following general formula (3):

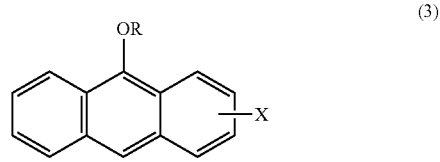

in the formula (3), R represents a $C_{1-12}$ alkyl group, and X represents a hydrogen atom or a $C_{1-8}$ alkyl group.

In the formulae (1) to (3), the alkyl group represented by R may be a methyl group, an ethyl group, an n-propyl group, an i-propyl group, an n-butyl group, an i-butyl group, a pentyl group, a hexyl group, a heptyl group, an octyl group, a 2-ethylhexyl group, a nonyl group, a decyl group or a dodecyl group.

The alkyl group represented by X may be linear or branched and may be a methyl group, an ethyl group, a propyl group, a butyl group, a pentyl group, a hexyl group, a 2-ethylhexyl group or the like.

Specific examples of the compounds represented by the formulae (1) to (3) include the following compounds. Compounds in which n=2 and X is a hydrogen atom, include 9,10-dimethoxyanthracene, 9,10-diethoxyanthracene, 9,10-dipropoxyanthracene, 9,10-dibutoxyanthracene, 9,10-bis(n-pentyloxy)anthracene, 9,10-bis(i-pentyloxyoxy)anthracene, 9,10-bis(n-hexyloxy)anthracene, 9,10-bis(n-heptyloxy)anthracene, 9,10-bis(n-octyloxy)anthracene, 9,10-bis(2-ethylhexyloxy)anthracene, etc.

Compounds in which n=1 and X is a hydrogen atom, include 9-methoxyanthracene, 9-ethoxyanthracene, 9-propoxyanthracene, 9-butoxyanthracene, 9-(n-pentyloxy)anthracene, 9-(i-pentyloxyoxy)anthracene, 9-(n-hexyloxy)anthracene, 9-(n-heptyloxy)anthracene, 9-(n-octyloxy)anthracene, 9-(2-ethylhexyloxy)anthracene, etc.

Specific examples of the case where n=2 and X is an alkyl group, include 2-methyl-9,10-dimethoxyanthracene, 2-methyl-9,10-diethoxyanthracene, 2-methyl-9,10-dipropoxyanthracene, 2-methyl-9,10-dibutoxyanthracene, 2-methyl-9,10-bis(n-pentyloxy)anthracene, 2-methyl-9,10-bis(i-pentyloxyoxy)anthracene, 2-methyl-9,10-bis(n-hexyloxy)anthracene, 2-methyl-9,10-bis(n-heptyloxy)anthracene, 2-methyl-9,10-bis(n-octyloxy)anthracene, 2-methyl-9,10-bis(2-ethylhexyloxy)anthracene, 2-ethyl-9,10-dimethoxyanthracene, 2-ethyl-9,10-diethoxyanthracene, 2-ethyl-9,10-dipropoxyanthracene, 2-ethyl-9,10-dibutoxyanthracene, 2-ethyl-9,10-bis(n-pentyloxy)anthracene, 2-ethyl-9,10-bis(i-pentyloxyoxy)anthracene, 2-ethyl-9,10-bis(n-hexyloxy)anthracene, 2-ethyl-9,10-bis(n-heptyloxy)anthracene, 2-ethyl-9,10-bis(n-octyloxy)anthracene, 2-ethyl-9,10-bis(2-ethylhexyloxy)anthracene, etc.

Specific examples of the case where n=1 and X is an alkyl group, include 2-methyl-9-methoxyanthracene, 2-methyl-9-ethoxyanthracene, 2-methyl-9-propoxyanthracene, 2-methyl-9-butoxyanthracene, 2-methyl-9-(n-pentyloxy)anthracene, 2-methyl-9-(i-pentyloxyoxy)anthracene, 2-methyl-9-(n-hexyloxy)anthracene, 2-methyl-9-(n-heptyloxy)anthracene, 2-methyl-9-(n-octyloxy)anthracene, 2-methyl-9-(2-ethylhexyloxy)anthracene, 2-ethyl-9-methoxyanthracene, 2-ethyl-9-ethoxyanthracene, 2-ethyl-9-propoxyanthracene, 2-ethyl-9-butoxyanthracene, 2-ethyl-9-(n-pentyloxy)anthracene, 2-ethyl-9-(i-pentyloxyoxy)anthracene, 2-ethyl-9-(n-hexyloxy)anthracene, 2-ethyl-9-(n-heptyloxy)anthracene, 2-ethyl-9-(n-octyloxy)anthracene, 2-ethyl-9-(2-ethylhexyloxy)anthracene, etc.

Even in a case where in the alkoxyanthracene compound represented by the formula (1), the substituent represented by X is a halogen atom, it can be used as a radical polymerization sensitizer. In such a case, the halogen atom may be a fluorine atom, a chlorine atom, a bromine atom or an iodine atom.

Specific examples of the case where n=2 and X is a halogen atom, include 2-chloro-9,10-dimethoxyanthracene, 2-chloro-9,10-diethoxyanthracene, 2-chloro-9,10-dipropoxyanthracene, 2-chloro-9,10-dibutoxyanthracene, 2-chloro-9,10-bis(n-pentyloxy)anthracene, 2-chloro-9,10-bis(i-pentyloxyoxy)anthracene, 2-chloro-9,10-bis(n-hexyloxy)anthracene, 2-chloro-9,10-bis(n-heptyloxy)anthracene, 2-chloro-9,10-bis(n-octyloxy)anthracene, 2-chloro-9,10-bis(2-ethylhexyloxy)anthracene, 2-bromo-9,10-dimethoxyanthracene, 2-bromo-9,10-diethoxyanthracene, 2-bromo-9,10-dipropoxyanthracene, 2-bromo-9,10-dibutoxyanthracene, 2-bromo-9,10-bis(n-pentyloxy)anthracene, 2-bromo-9,10-bis(i-pentyloxyoxy)anthracene, 2-bromo-9,10-bis(n-hexyloxy)anthracene, 2-bromo-9,10-bis(n-heptyloxy)anthracene, 2-bromo-9,10-bis(n-octyloxy)anthracene, 2-bromo-9,10-bis(2-ethylhexyloxy)anthracene, etc.

Specific examples of the case where n=1 and X is a halogen atom, include 2-chloro-9-methoxyanthracene, 2-chloro-9-ethoxyanthracene, 2-chloro-9-propoxyanthracene, 2-chloro-9-butoxyanthracene, 2-chloro-9-(n-pentyloxy)anthracene, 2-chloro-9-(i-pentyloxyoxy)anthracene, 2-chloro-9-(n-hexyloxy)anthracene, 2-chloro-9-(n-heptyloxy)anthracene, 2-chloro-9-(n-octyloxy)anthracene, 2-chloro-9-(2-ethylhexyloxy)anthracene, 2-bromo-9-methoxyanthracene, 2-bromo-9-ethoxyanthracene, 2-bromo-9-propoxyanthracene, 2-bromo-9-butoxyanthracene, 2-bromo-9-(n-pentyloxy)anthracene, 2-ethyl-9-(i-pentyloxy)anthracene, 2-bromo-9-(n-hexyloxy)anthracene, 2-bromo-9-(n-heptyloxy)anthracene, 2-bromo-9-(n-octyloxy)anthracene, 2-bromo-9-(2-ethylhexyloxy)anthracene, etc.

Among these exemplified compounds, from the viewpoint of easy production and high performance, preferred is a compound in which X is a hydrogen atom, n is 2 and R is $C_{2-8}$, and particularly preferred is 9,10-diethoxyanthracene, 9,10-dipropoxyanthracene or 9,10-dibutoxyanthracene.

(Singlet Oxygen Quencher)

The singlet oxygen quencher in the present invention is a compound capable of deactivating singlet oxygen by energy transfer from oxygen in a singlet state and may, for example, be an unsaturated hydrocarbon such as cis-1,2-diethoxyethene, 2-methyl-2-pentene, trans-3-methyl-2-pentene, 3,5-dioxacyclopentene, 1-methylcyclopentene, 1,2-dimethylcylohexene, cyclopentadiene, 1,3-cyclohexadiene, α-terpinene, all trans-retinol, salsinaphthofulene, C-30 carotenes, C-35 carotenes, β-Apo-8'-carotenal, lutein, isozeazantin, β-carotene, canthaxanthin, or lycopene; a primary amine such as butylamine, or benzylamine; a secondary amine such as diethylamine, dipropylamine, diisopropylamine, tetrahydropyrrole, piperidine, 2,6-dimethylpyperidine, di(2-hydroxyethyl)methylamine, or N,N-dimethylisobutenylamine; a tertiary amine such as trimethylamine, triethylamine, diethyl(2-hydroxyethyl)amine, diethyl(2-methoxyethyl)amine, diethyl(2-cyanoethyl)amine, diethyl(7-aminoheptyl)amine, tributylamine, di(2-hydroxyethyl)-t-butylamine, Tröger's base, 1-methylpiperidine, 4-hydroxy-1,2,2,6,6-pentamethylpiperidine, 1-cyclohexylpiperidine, quinuclidine, piperazine or 1,4-diazabicyclo[2.2.2]octane; an aromatic amine such as aniline, 2-aminonaphthalene, N-methylaniline, diphenylaniline, 4,4'-t-octyldiphenylamine, N,N-dimethylaniline, m-chloro-N,N-dimethylaniline, p-bromo-N,N-dimethylaniline, p-methyl-N,N-dimethylaniline, p-cyano-N,N-dimethylaniline, p-(N,N-dimethylamino)benzaldehyde, m-methoxy-N,N-dimethylaniline, p-methoxy-N,N-dimethylaniline, o-phenylenediamine, 4,4'-diaminobiphenyl, 1-isopropylamino-4-phenylaminobenzene, 1-cyclohexylamino-4-phenylaminobenzene, 1-cyclohexylamino-4-phenylaminobenzene hydrochloride, N,N',N'',N'''-tetramethylphenylenediamine, or luminol; a furan compound such as furan, 2-methylfuran, furfurylamine, 2-methoxyfuran, furfuryl alcohol, furfuryl methyl ether, 2-furoic acid, 2-vinylfuran, α-methyl furfuryl alcohol, α-benzyl furfuryl alcohol, α-phenylethyl furfuryl alcohol, α-(3-phenylpropyl) furfuryl alcohol, α-benzhydryl furfuryl alcohol, α,α-diphenyl furfuryl alcohol, 2-acetylfuran, N-methyl furfurylamine, 2-phenylfuran, 3-phenylfuran, 3-(4'-fluorophenyl)furan, 2-(4'-chlorophenyl)furan, 3-(4'-bromophenyl)furan, 2-(4'-methylphenyl)furan, 3-(4'-methylphenyl)furan, 2-(4'-methoxyphenyl)furan, 3-(4'-methoxyphenyl)furan, 2,4-dimethylfuran, 2,5-dimethylfuran, 2,5-diphenylfuran, 3,4-diphenylfuran, 2,3,4,5-tetraphenylfuran, 2,2(2,5)furanophane, isobenzofuran, 1,3-diphenylisobenzofuran, 1,3-diphenyl-5,6-dimethylisobenzofuran, 1,3,4,7-tetraphenylisobenzofuran, or 1,3,4,5,6,7-hexaphenylisobenzofuran; a condensed polycyclic aromatic compound such as naphthalene, dimethylnaphthalene, dimethoxyanthracene, anthracene, diphenylanthracene, phenanthrene, pyrene, chrysene, perylene, coronene, tetracene, pentacene, rubrene, 3,4-benzofluoranethrene, 2,3-benzofluorene, 1,12-benzoperylene, 3,4-benzopyrene, 4,5-benzopyrene, 9,10-bis(4-methoxyphenyl)anthracene, 9,10-diphenylanthracene, 1-chloro-9,10-diphenylanthracene, 9-phenylanthracene, 4,5-methylenephenanthrene, decacyclene, 1,2,3,4-dibenzanthracene, 1,2,5,6-dibenzanthracene, perifranthlene, 4,7-diphenyl-1,10-phenanthroline, fluoranthene, 3-methylcholanthrene, triphenylene, benzo[ghi]perylene, 4H-cyclopenta[def]phenanthrene, and C1-C20 alkyl-substituted compounds and alkoxy-substituted compounds thereof; as well as compounds exemplified as singlet oxygen quenchers in Harry H. wasserman, "Singlet Oxygen", Chapter 5, Academic Press (1979), Nicholas J. Turro, "Modern Molecular Photochemistry", Chapter 14, The Benjamin/Cummings Publishing Co., Inc. (1978), and High Performance Chemicals for Color Photographic Light-sensitive Materials, Chapter 7 (2002), published by CMC. Further, as a singlet oxygen quencher, a metal complex having a compound having a sulfur atom as a ligand may be mentioned. As such a singlet oxygen quencher, for example, a transition metal chelate compound such as a nickel complex, a cobalt complex, a copper complex, a manganese complex, a platinum complex or the like having bisdithio-α-diketone, bisphenyldithiol or thiobisphenol as a ligand, may be mentioned.

Among these exemplified compounds, from the viewpoint of high activity, suitable singlet oxygen quenchers are preferably tertiary amines such as trimethylamine, triethylamine, diethyl(2-hydroxyethyl)amine, diethyl(2-methoxyethyl) amine, diethyl(2-cyanoethyl)amine, diethyl(7-aminoheptyl) amine, tributylamine, di(2-hydroxyethyl)-t-butylamine, Tröger's base, 1-methylpiperidine, 4-hydroxy-1,2,2,6,6-pentamethylpiperidine, 1-cyclohexylpiperidine, quinuclidine, piperazine, 1,4-diazabicyclo[2.2.2]octane, etc.; and furan compounds such as furan, 2-methylfuran, furfurylamine, 2-methoxyfuran, furfuryl alcohol, furfuryl methyl ether, 2-furoic acid, 2-vinylfuran, α-methylfurfuryl alcohol, α-benzylfurfuryl alcohol, α-phenylethylfurfuryl alcohol, α-(3-phenylpropyl)furfuryl alcohol, α-benzhydrylfurfuryl alcohol, α,α-diphenylfurfuryl alcohol, 2-acetylfuran, N-methylfurfurylamine, 2-phenylfuran, 3-phenylfuran, 3-(4'-fluorophenyl)furan, 2-(4'-chlorophenyl)furan, 3-(4'-bromophenyl)furan, 2-(4'-methylphenyl)furan, 3-(4'-methylphenyl)furan, 2-(4'-methoxyphenyl)furan, 3-(4'-methoxyphenyl)furan, 2,4-dimethylfuran, 2,5-dimethylfuran, 2,5-diphenylfuran, 3,4-diphenylfuran, 2,3,4,5-tetraphenylfuran, 2,2(2,5)furanophane, isobenzofuran, 1,3-diphenylisobenzofuran, 1,3-diphenyl-5,6-dimethylisobenzofuran, 1,3,4,7-tetraphenylisobenzofuran, 1,3,4,5,6,7-hexaphenylisobenzofuran, etc.; and among them, tertiary amines are more preferred, and triethylenediamine is particularly preferred.

An alkoxyanthracene being the photopolymerization sensitizer of the present invention, is also a singlet oxygen quencher in the sense that it is decomposed by reacting with singlet oxygen, and therefore, a compound that is more active against singlet oxygen than an alkoxyanthracene compound, is preferred, since it is possible to obtain the effect by addition in a small amount, and thus, a compound having a rate constant k for quenching singlet oxygen larger than that of an alkoxyanthracene compound is preferred.

(Photopolymerization Sensitizer Composition)

A photopolymerization sensitizer composition can be obtained by adding a singlet oxygen quencher to the alkoxyanthracene compound represented by the formula (1).

The addition amount of the singlet oxygen quencher to the alkoxyanthracene compound of the present invention depends on the singlet oxygen quencher, but is from 0.1 to 10 times by weight, more preferably from 0.5 to 5 times by weight.

The photopolymerization sensitizer composition of the present invention preferably further contains an antioxidant. The antioxidant may be a phenolic antioxidant, an amine-type antioxidant, a phosphorus-type antioxidant, a sulfur-type antioxidant or the like.

The phenolic antioxidant may, for example, be butylhydroxytoluene, 2,6-t-butyl-4-methylphenol, n-octadecyl-3-(3'5'-di-t-butyl 4'-hydroxyphenyl)propionate, α-tocopherol, sinapyl alcohol, vitamin E, a hydroxyphenyl propionate compound, a hydroxybenzyl compound, a thiophenol compound, or an alkanediylphenol compound.

Specific examples of the hydroxyphenyl propionate compound include 3,9-bis[2-[3-(3-t-butyl-4-hydroxy-5-methylphenyl)propionyloxy]-1,1-dimethylethoxy]-2,4,8,10-tetraoxaspiro[5.5]undecane, pentaerythritol tetrakis[3-(3,5-di-t-butyl-4-hydroxyphenyl)propionate], triethylene glycol-bis [3-(3-t-butyl-5-methyl-4-hydroxyphenyl)propionate], 1,6-hexanediol-bis[3-(3,5-di-t-butyl-4-hydroxyphenyl) propionate], 2,2-thio-diethylenebis[3-(3,5-di-t-butyl-4-hydroxyphenyl)propionate], octadecyl-[3-(3,5-di-t-butyl-4-hydroxyphenyl)propionate], tetrakis[methylene-3-(3,5'-di-t-butyl-4'-hydroxyphenylpropionate)]methane, etc.

Specific examples of the hydroxybenzyl compound include 1,3,5-trimethyl-2,4,6-tris(3',5'-di-t-butyl-4-hydroxybenzyl)benzene, 1,3,5-tris(4-hydroxybenzyl)benzene, tris-(3,5-di-t-butyl-4-hydroxybenzyl)-isocyanurate, 1,3,5-tris(4-t-butyl-3-hydroxy-2,6-dimethylbenzyl)-isocyanurate, etc.

Specific examples of the thiophenol compound include 4,4'-thiobis(6-t-butyl-3-methylphenol), etc., and specific examples of the thiomethylphenol compound include 2,4-bis[(octylthio)methyl]-o-cresol, etc.

Specific examples of the alkanediylphenol compound include N,N'-hexamethylenebis(3,5-di-t-butyl-4-hydroxyhydrocinnamamide), 2,2'-methylenebis(4-methyl-6-t-butylphenol), 4,4'-butylidene-bis(3-methyl-6-t-butylphenol), 1,1,3-tris(2-methyl-4-hydroxy-5-t-butylphenyl)butane, etc.

Commercial products of the antioxidant having a phenol structure include, for example, ADK STAB AO-20, AO-30, AO-40, AO-50, AO-60, AO-70, AO-80, AO-80 and AO-330 (above, ADEKA Corporation), sumilizer GM, GS, MDP-S, BBM-S, WX-R and GA-80 (above, Sumitomo Chemical Co., Ltd.), IRGANOX 1010, 1035, 1076, 1098, 1135, 1330, 1726, 1425WL, 1520L, 245, 259, 3114, 565, and IRGAMOD 295 (above BASF), Yoshinox BHT, BB, 2246G, 425, 250, 930, SS, TT, 917 and 314 (above, API Corporation), etc.

Specific examples of the amine-type antioxidant include 4-benzoyloxy-2,2,6,6-tetramethylpiperidine, sebacic acid-bis(2,2,6,6-tetramethyl-4-piperidyl), sebacic acid-bis(N-methyl-2,2,6,6-tetramethyl-4-piperidyl), etc. Commercial products include ADK STAB (registered trademark) LA-77, LA-57, LA-52, LA-62, LA-63, LA-67 and LA-68 (manufactured by ADEKA Corporation). Further, TINUVIN (registered trademark) 123, TINUVIN 144, TINUVIN 622, TINUVIN 765 and TINUVIN 944 (manufactured by BASF) may also be mentioned.

Specific examples of the phosphorus-type antioxidant include triphenyl phosphite, trisnonylphenyl phosphite, tris (2,4-di-tert-butylphenyl)phosphite, trimethyl phosphate, triethyl phosphate, tributyl phosphate, trioctyl phosphate, triphenyl phosphate, tricresyl phosphate, tris(nonylphenyl)

phosphate, 2-ethylphenyl diphenyl phosphate, 3,9-bis(2,6-di-tert-butyl-4-methylphenoxy)-2,4 8,10-tetraoxa-3,9-diphosphaspiro[5.5]undecane, diisodecyl pentaerythritol diphosphite, bis(2,4-di-t-butylphenyl)pentaerythritol diphosphite, 2,2'-methylenebis(4,6-di-t-butyl-1-phenyloxy)(2-ethylhexyloxy)phosphorus, 6-[3-(3-t-butyl-4-hydroxy-5-methylphenyl)propoxy]-2,4,8,10-tetra-t-butyldibenz[d,f][1,3,2]dioxaphosphepin, triphenylphosphite, diphenylisodecylphosphite, phenyldiisodecylphosphite, 4,4'-butylidene-bis(3-methyl-6-t-butylphenylditridecyl) phosphite, octadecylphosphite, tris(nonylphenyl)phosphite, 9,10-dihydro-9-oxa-10-phosphaphenanthrene-10-oxide, 10-(3,5-di-t-butyl-4-hydroxybenzyl)-9,10-dihydro-9-oxa-10-phosphaphenanthrene-10-oxide, 10-decyloxy-9,10-dihydro-9-oxa-10-phosphaphenanthrene-10-oxide, tris(2,4-di-t-butylphenyl)phosphite, cyclic neopentanetetraylbis(2,4-di-t-butylphenyl)phosphite, cyclic neopentanetetraylbis(2,6-di-t-butylphenyl)phosphite, 2,2-methylenebis(4,6-di-t-butylphenyl)octylphosphite, tetrakis(2,4-di-t-butylphenyl)[1,1-biphenyl]-4,4'-diylbisphosphonite, bis[2,4-bis(1,1-dimethylethyl)-6-methylphenyl] ethyl ester, phosphonic acid, etc.

The sulfur-type antioxidant may, for example, be a thiopropionate-type compound or a mercaptobenzimidazole-type compound. Specific examples of the thiopropionate-type compound include 2,2-bis({[3-(dodecylthio)propionyl]oxy}methyl)-1,3-propanediyl-bis[3-(dodecylthio) propionate], dilauryl-3,3'-thiodipropionate, dimyristyl-3,3'-thiodipropionate, distearyl-3,3'-thiodipropionate, pentaerythritol tetrakis(3-laurylthiopropionate), etc. Specific examples of the mercaptobenzimidazole-type compound include 2-mercaptobenzimidazole, etc.

Among these exemplified compounds, phenolic antioxidants are preferred from the viewpoint of high activity.

The amount of the antioxidant added to the alkoxyanthracene compound of the present invention depends on the antioxidant, but is from 0.01 to 5 times by weight, more preferably from 0.02 to 3 times by weight.

To the photopolymerization sensitizer composition of the present invention, a light stabilizer may be further added so long as the effects of the present invention will not be impaired. Further, a photopolymerization sensitizer other than the alkoxyanthracene compound represented by the formula (1) may be added. It is also possible to add a solvent to form a slurry or a solution.

(Photopolymerizable Composition)

Since the photopolymerization sensitizer composition of the present invention is active for both photoradical polymerization and photocationic polymerization, the photopolymerizable composition may be made to be a photoradical polymerization composition, or a photocationic polymerization composition. It is also possible to make it to be a hybrid composition in which both photoradical polymerization and photocationic polymerization will proceed.

(Photoradical Polymerizable Composition)

The photopolymerization sensitizer composition of the present invention acts as a photoradical polymerization sensitizer in a radical polymerization reaction. By mixing the photoradical polymerization sensitizer composition with a photoradical polymerization initiator and a radical polymerizable compound, a photoradical polymerizable composition can be prepared. The photoradical polymerizable composition can be easily photo-polymerized by irradiating it with light in a wavelength range of from 300 nm to 500 nm, and coloring of the cured product can be suppressed.

As the radical polymerization initiator to be used in the present invention, a benzyl methyl ketal type or α-hydroxyalkylphenone type polymerization initiator or an α-aminoalkylphenone type radical polymerization initiator may be mentioned. As a specific compound of the benzylmethyl ketal-type radical polymerization initiator, 2,2-dimethoxy-1,2-diphenylethan-1-one (trade name "Irgacure 651" manufactured by BASF) may be mentioned. As the α-hydroxyalkylphenone-type radical polymerization initiator, 1-hydroxycyclohexyl phenyl ketone (trade name "Irgacure 184" manufactured by BASF), 2-hydroxy-2-methyl-1-phenylpropan-1-one (trade name "Darocure 1173" manufactured by BASF), 1-[4-(2-hydroxyethoxy)-phenyl]-2-hydroxy-2-methyl-1-propan-1-one (trade name "Irgacure 2959" manufactured by BASF), 2-hydroxy-1-{4-[4-(2-hydroxy-2-methylpropionyl)-benzyl]phenyl}-2-methyl-1-one (trade name "Irgacure 127", manufactured by BASF), etc. may be mentioned. As the α-aminoalkylphenone-type radical polymerization initiator, 2-methyl-1-(4-methylthiophenyl)-2-morpholinopropan-1-one (trade name "Irgacure 907" manufactured by BASF), 2-benzyl-2-dimethylamino-1-(4-morpholinophenyl)-butanone-1 (trade name "Irgacure 369" manufactured by BASF), etc., may be mentioned. As the acetophenone-type radical polymerization initiator, acetophenone, 2-hydroxy-2-phenylacetophenone, 2-ethoxy-2-phenylacetophenone, 2-methoxy-2-phenylacetophenone, 2-isopropoxy-2-phenylacetophenone, 2-isobutoxy-2-phenylacetophenone, etc., may be mentioned. As the benzyl-type radical polymerization initiator, benzyl, 4,4'-dimethoxybenzyl, etc. may be mentioned, and as the anthraquinone-type polymerization initiator, 2-ethylanthraquinone, 2-t-butylanthraquinone, an aminoalkylphenone type, etc. may be mentioned.

The addition amount of the radical polymerization sensitizer composition of the present invention to the radical polymerization initiator is at least 0.01 times by weight and less than 10 times by weight, more preferably at least 0.05 times by weight and less than 1.0 times by weight. If it is less than 0.01 times by weight, the effect of the sensitizer will be poor, and even if it is added in an amount of at least 10 times by weight, the performance will not be improved further, and therefore, there will be no point in adding excessively.

Although the mechanism of action of the radical polymerization sensitizer of the present invention is not clear, it is considered that the alkoxyanthracene compound is excited by absorbing light in the ultraviolet region, and the excited species gives energy to the radical polymerization initiator, so that the radical polymerization initiator will be cleaved, thereby to promote the generation of radical species.

The radical polymerizable compound to be used in the present invention may, for example, be styrene, p-hydroxystyrene, vinyl acetate, acrylic acid, methacrylic acid, acrylonitrile, methacrylonitrile, acrylamide, an acrylic acid ester, a methacrylic acid ester, etc., or oligomers thereof.

Among the radical polymerizable compounds, an acrylic acid ester or a methacrylic acid ester is preferred, and a polyfunctional acrylate such as a bifunctional acrylate or a trifunctional acrylate is particularly preferred.

As the acrylic acid ester, the following specific examples may be mentioned. First, as the bifunctional acrylate, ethoxylated bisphenol A diacrylate, 9,9-bis[4-(2-acryloyloxyethoxy)phenyl]fluorene, tricyclodecane dim ethanol diacrylate, 1,10-decanediol diacrylate, 1,9-nonanediol diacrylate, dipropylene glycol diacrylate, tripropylene glycol diacrylate, 1,3-butylene glycol diacrylate, 1,4-butanediol diacrylate, diethylene glycol diacrylate, 1,6-hexanediol diacrylate, tetraethylene glycol diacrylate, triethylene glycol diacrylate, tripropylene glycol diacrylate, ethoxylated (3)

bisphenol A diacrylate, an alkoxylated neopentyl glycol diacrylate, etc. may be mentioned.

As the trifunctional or higher polyfunctional acrylate, ethoxylated isocyanuric acid triacrylate, ε-caprolactone-modified tris-(2-acryloyloxyethyl) isocyanurate, pentaerythritol triacrylate, trimethylolpropane triacrylate, ditrimethylolpropane tetraacrylate, ethoxylated pentaerythritol tetraacrylate, pentaerythritol tetraacrylate, dipentaerythritol hexaacrylate, tris(2-hydroxyethyl)isocyanurate triacrylate, ethoxylated trimethylolpropane triacrylate, pentaerythritol triacrylate, pentaerythritol tetraacrylate, ditrimethylolpropane tetraacrylate, dipentaerythritol pentaacrylate, etc., may be mentioned. Further, epoxy acrylate, urethane acrylate, polyester acrylate, polybutadiene acrylate, polyol acrylate, polyether acrylate, silicone resin acrylate, imide acrylate, etc., may also be used.

Similarly, as the methacrylate compound, as a bifunctional methacrylate, ethylene glycol dimethacrylate, diethylene glycol dimethacrylate, triethylene glycol dimethacrylate, ethoxylated bisphenol A dimethacrylate, tricyclodecane dimethanol dimethacrylate, 1,6-hexanediol dimethacrylate, 1,9-nonanediol dimethacrylate, neopentyl glycol dimethacrylate, glycerin dimethacrylate, tetraethylene glycol dimethacrylate, polyethylene glycol dimethacrylate, 1,4-butanediol dimethacrylate, diethylene glycol dimethacrylate, 1,3-butylenediol dimethacrylate, ethoxylated bisphenol A dimethacrylate, etc., may be mentioned. As the trifunctional or higher-functional polyfunctional methacrylate, trimethylolpropane trimethacrylate, etc., may be mentioned.

These radical polymerizable compounds may be used alone or in combination of two or more types.

The total addition amount of the photoradical polymerization initiator and photoradical polymerization sensitizer composition of the present invention is at least 0.01% by weight and less than 3.0% by weight, preferably at least 0.05% by weight and less than 1.0% by weight, to the radical polymerizable compound. If the total addition amount of the photoradical polymerization initiator and the photoradical polymerization sensitizer composition is less than 0.01% by weight, the photopolymerization rate may tend to be slowed down, and on the other hand, if the total addition amount of the photoradical polymerization initiator and the photoradical polymerization sensitizer composition is at least 3.0% by weight, the physical properties of the photopolymerization product may tend to be deteriorated, such being undesirable.
(Photocationic Polymerizable Composition)

The photopolymerization sensitizer composition of the present invention acts as a photocationic polymerization sensitizer in a cationic polymerization reaction. By mixing the photocationic polymerization sensitizer composition with a photocationic polymerization initiator and a cationic polymerizable compound, a photocationic polymerizable composition can be obtained. The photocationic polymerizable composition can be easily photopolymerized by irradiating it with light in a wavelength range of from 300 nm to 500 nm, and can suppress coloring of the cured product.
(Photocationic Polymerization Initiator)

As the photocationic polymerization initiator to be used in the present invention, one which generates a polymerization initiation species for the photocationic polymerizable compound upon irradiation with light, is used. In particular, a photoacid generator which generates a Bronsted acid, a Lewis acid or the like by light irradiation, is preferably used.

As such a photocationic polymerization initiator, a sulfonic acid ester, an imidosulfonate, a dialkyl-4-hydroxysulfonium salt, an arylsulfonic acid-p-nitrobenzyl ester, a silanol-aluminum complex, a (η6-benzene)(η5-cyclopentadienyl) iron(II), etc., may be mentioned, and more specifically, benzoin tosylate, 2,5-dinitrobenzyl tosylate, N-tosylphthalimide, etc. may be mentioned.

Further, an aromatic iodonium salt, an aromatic sulfonium salt, an aromatic diazonium salt, an aromatic phosphonium salt, a triazine compound, an iron arene complex, etc., may be mentioned. Specifically, an iodonium salt such as an iodonium chloride, bromide, borofluoride salt, hexafluorophosphate salt, hexafluoroantimony salt, triflate salt or p-toluenesulfonate salt, such as diphenyliodonium, ditolyliodonium, bis(p-tert-butylphenyl)iodonium, or bis(p-chlorophenyl)iodonium; a sulfonium salt such as sulfonium chloride, bromide, borofluoride salt, hexafluorophosphate salt, hexafluoroantimonate salt, triflate salt or perfluoro-1-butane sulfonate salt, such as triphenylsulfonium, diphenyl (4-methoxyphenyl)sulfonium, (4-phenoxyphenyl)diphenylsulfonium, diphenyl(4-phenylthiophenyl)sulfonium, tris (4-tert-butylphenyl)sulfonium, tris(4-methylphenyl) sulfonium, triarylsulfonium, or S,S-dialkyl-S-phenacylsulfonium; a thianthrenium salt such as a chloride, bromide, borofluoride salt, hexafluorophosphate salt, hexafluoroantimonate salt, triflate salt or perfluoro-1-butanesulfonate salt of 5-arylthianthrenium salt; and a 2,4,6-substituted-1,3,5-triazine compound, such as 2,4,6-tris (trichloromethyl)-1,3,5-triazine, 2-phenyl-4,6-bis (trichloromethyl)-1,3,5-triazine or 2-methyl-4,6-bis (trichloromethyl)-1,3,5-triazine, may be mentioned, but not limited thereto.

Among these listed cationic photopolymerization initiators, aromatic sulfonium salts and aromatic iodonium salts are preferred because of high efficiency and easy availability.

For example, aromatic sulfonium salts include S,S,S',S'-tetraphenyl-S,S'-(4,4'-thiodiphenyl)disulfonium bishexafluorophosphate, diphenyl-4-phenylthiophenylsulfonium hexafluorophosphate, triphenylsulfonium hexafluorophosphate, etc. For example, trade name: UVI6992 manufactured by Dow Chemical Co.; trade names: CPI-100P, CPI-101A, CPI-200K, CPI-210S, etc. manufactured by San-Apro Ltd.; trade name: Irgacure 270 manufactured by BASF; etc., may be used ("Irgacure" is a registered trademark of BASF). Aromatic iodonium salts include 4-isobutylphenyl-4'-methylphenyliodonium hexafluorophosphate, bis(dodecylphenyl)iodonium hexafluoroantimonate, 4-isopropylphenyl-4'-methylphenyliodonium tetrakispentafluorophenylborate, etc. For example, trade name: Irgacure 250, manufactured by BASF; trade name: Rhodorsil 2074 ("Rhodorsil" is a registered trademark of Rhodia) manufactured by Rhodia, etc., may be mentioned.

The amount of such a cationic photopolymerization initiator to be used is not particularly limited, but it is usually used in a range of from 0.001% by weight to 20% by weight, more preferably in a range of from 0.01% by weight to 10% by weight, to the cationic photopolymerizable compound in the photopolymerizable composition.

The photocationic polymerizable compound to be used in the present invention is a compound that undergoes cationic polymerization by an acid such as a Bronsted acid or a Lewis acid. For example, a cyclic ether or cyclic thioether containing an epoxy ring, an oxetane ring, a tetrahydrofuran ring, a tetrahydropyran ring, a dioxolane ring, a dithiane ring, a trithiane ring, a dithiolane ring or the like, a thioether, a vinyl ether, a lactone or the like, may be mentioned.

The photocationic polymerizable compound may, for example, be a compound having one epoxy ring in the molecule, such as diglycerol diether, phenyl glycidyl ether, p-tert-butylphenyl glycidyl ether, butyl glycidyl ether, 2-ethylhexyl glycidyl ether, allyl glycidyl ether, 1,2-butylene oxide, 1,3-butadiene monooxide, 1,2-epoxydodecane, epichlorohydrin, 1,2-epoxydecane, styrene oxide, cyclohexene oxide, 3-methacryloyloxymethyl cyclohexene oxide, 3-acryloyloxymethyl cyclohexene oxide, 3 vinylcyclohexene oxide, glycidyl (meth)acrylate, vinylcyclohexene oxide, 4-vinylepoxycyclohexane, dioctyl epoxyhexahydrophthalate or di-2-ethylhexyl epoxyhexahydrophthalate; a compound having two or more epoxy rings in the molecule, such as bisphenol A diglycidyl ether, bisphenol F diglycidyl ether, bisphenol S diglycidyl ether, brominated bisphenol A diglycidyl ether, brominated bisphenol F diglycidyl ether, brominated bisphenol S diglycidyl ether, epoxy novolac resin, hydrogenated bisphenol A diglycidyl ether, hydrogenated bisphenol F diglycidyl ether, hydrogenated bisphenol S diglycidyl ether, 3',4'-epoxycyclohexylmethyl-3,4-epoxycyclohexanecarboxylate (e.g. UVR6105 or UVR6110 manufactured by DOW, Celloxide 2021P manufactured by Daicel Corporation, "Celloxide" is a registered trademark of Daicel Corporation, etc.), 1,2-epoxy-4-vinylcyclohexane (e.g. Celloxide 2000 manufactured by Daicel Corporation), 2-(3,4-epoxycyclohexyl-5,5-spiro-3,4-epoxy)cyclohexane metadioxane, bis(3,4-epoxycyclohexylmethyl)adipate, bis(3,4-epoxy-6-methylcyclohexylmethyl) adipate, 3,4-epoxy-6-methylcyclohexyl-3',4'-epoxy-6'-methylcyclohexanecarboxylate, methylenebis(3,4-epoxycyclohexane), dicyclopentadiene diepoxide, ethylene glycol di(3,4-epoxycyclohexylmethyl) ether, ethylenebis(3,4-epoxycyclohexane carboxylate), 1,4-butanediol diglycidyl ether, 1,6-hexanediol diglycidyl ether, glycerin triglycidyl ether, trimethylolpropane triglycidyl ether, polyethylene glycol diglycidyl ether, polypropylene glycol diglycidyl ethers, 1,1,3-tetradecadiene dioxide, limonene dioxide, 1,2,7,8-diepoxyoctane, or 1,2,5,6-diepoxycyclooctane, a compound having an oxetane ring, such as 3-ethyl-3-hydroxymethyl oxetane (oxetane alcohol), 2-ethylhexyl oxetane, xylylene bisoxetane or 3-ethyl-3{[(3-ethyloxetan-3-yl)methoxy]methyl}oxetane; or a vinyl ether such as methyl vinyl ether, ethyl vinyl ether, n-propyl vinyl ether, n-butyl vinyl ether, cyclohexyl vinyl ether, isobutyl vinyl ether, 2-ethylhexyl vinyl ether, 2-hydroxyethyl vinyl ether, 4-hydroxybutyl vinyl ether, cyclohexanemethanol monovinyl ether, diethylene glycol monovinyl ether, 1,4-butanediol divinyl ether, cyclohexanedimethanol divinyl ether, diethylene glycol divinyl ether, triethylene glycol divinyl ether or allyl vinyl ether.

One type of these photocationic polymerizable compounds may be used alone, or two or more types of them may be used in combination. Among these photocationic polymerizable compounds, a compound having an epoxy ring or an oxetane ring, or a vinyl ether, is preferred from the viewpoint of high cation-polymerizability and availability. In particular, an alicyclic epoxy compound such as 3',4'-epoxycyclohexylmethyl-3,4-epoxycyclohexanecarboxylate is preferred.

The total amount of the photocationic polymerization initiator and the photocationic polymerization sensitizer composition of the present invention added, is at least 0.01% by weight and less than 3.0% by weight, preferably at least 0.05% by weight and less than 1.0% by weight, to the cationic polymerizable compound. If the total amount of the photocationic polymerization initiator and the photocationic polymerization sensitizer composition added is less than 0.01% by weight, the photopolymerization rate may be slowed down. On the other hand, if the total amount of the photocationic polymerization initiator and the photocationic polymerization sensitizer composition added is at least 3.0% by weight, the physical properties of the photopolymerization product may be deteriorated, such being undesirable.

(Hybrid Composition)

The photopolymerization sensitizer composition of the present invention acts as both a photoradical polymerization sensitizer composition and a photocationic polymerization sensitizer composition, and therefore, it can be used also for a hybrid composition containing a radical polymerizable compound and a cationic polymerizable compound.

(Other Additives)

To the photopolymerizable composition of the present invention, further within a range not to impair the effects of the present invention, various resin additives including a coloring agent such as a pigment or a dye, an organic or inorganic filler, a leveling agent, a surfactant, a defoaming agent, a thickener, a flame retardant, an antioxidant, a stabilizer, a lubricant, a plasticizer and a water repellent, may be blended within a usual range of use.

The coloring agent may be a black pigment, a yellow pigment, a red pigment, a blue pigment or a white pigment. The black pigment may, for example, be carbon black, acetylene black, lamp black or aniline black. The yellow pigment may, for example, be yellow lead, zinc yellow, cadmium yellow, yellow iron oxide, mineral fast yellow, nickel titanium yellow, navels yellow, naphthol yellow S, Hansa yellow G, Hansa yellow 10G, benzidine yellow G, benzidine yellow GR, quinoline yellow lake, permanent yellow NCG or tartrazine lake. The red pigment may, for example, be red iron oxide, cadmium red, red lead, mercury cadmium sulfide, permanent red 4R, resole red, lake red D brilliant carmine 6B, eosin lake, rhodamine lake B, alizarin lake or brilliant carmine 3B. The blue pigment may, for example, be navy blue, cobalt blue, alkali blue lake, Victoria blue lake, phthalocyanine blue, metal-free phthalocyanine blue, phthalocyanine blue partial chloride, fast sky blue or indanthrene blue BC. The white pigment may, for example, be zinc white, titanium oxide, antimony white or zinc sulfide. Other pigments may, for example, be barite powder, barium carbonate, clay, silica, white carbon, talc, and alumina white. However, a triarylamine-type dye is excluded because triarylamine itself becomes a singlet oxygen quencher, whereby the effect of the present invention will be diminished.

(Polymerization Method)

The photopolymerizable composition of the present invention may be polymerized in the form of a film or in the form of a block. In the case of polymerizing it into a film, the photopolymerizable composition is liquefied, and the photopolymerizable composition is applied onto a substrate such as a polyester film or a tack film using, for example, a bar coater, and then, irradiated with light including light in a wavelength of from 300 nm to 500 nm to cure it.

(Coating)

As a substrate to be used for the polymerization into a film, a film, paper, aluminum foil, metal or the like is mainly used, but it is not particularly limited. As the material to be used for the film as the substrate, polyester, triacetyl cellulose (TAC), polyvinyl alcohol (PVA) or the like is used. The thickness of the substrate film is usually less than 100 µm. The bar coater to be used to adjust the film thickness of the coating film obtainable by applying the photopolymerizable composition is not particularly specified, but a bar coater capable of adjusting the film thickness to be at least 1 µm and less than 100 µm, is used. On the other hand, it is also possible to apply a thinner film or a thicker film by a spin coating method or a screen printing method.

(Irradiation Source)

The coating film made of the photopolymerizable composition thus prepared is irradiated with light including light having a wavelength in the range of from 300 nm to 500 nm at an intensity of from about 1 to 2,000 mW/cm$^2$, to obtain a photopolymerized product. As the irradiation source to be used, any lamp having an emission spectrum in a wavelength range of from 300 nm to 500 nm may be used, and it is possible to use an electrodeless lamp such as D-bulb or V-bulb manufactured by Fusion, a xenon lamp, a black light, an ultra high pressure mercury lamp, a metal halide lamp, a gallium-doped lamp, ultraviolet LED, a laser, etc. Further, it can also be cured by sunlight. In particular, since the photopolymerization sensitizer composition of the present invention is effective, light including light in a wavelength range of from 370 nm to 420 nm is preferred, and an ultraviolet LED with light having a central wavelength of 405 nm, an ultraviolet LED with light having a central wavelength of 395 nm, an ultraviolet LED with light having a central wavelength of 385 nm, an ultraviolet LED with light having a central wavelength of 375 nm, and a semiconductor laser having a wavelength of 405 nm, are practically particularly preferred.

EXAMPLES

Hereinafter, the present invention will be described in detail with reference to Examples, but is presented for the purpose of exemplification. That is, the following Examples are not intended to be exhaustive or to limit the present invention to the forms as described. Therefore, the present invention is not limited to the following Examples as long as the gist of the invention is not exceeded. Further, all parts and percentages are by weight unless otherwise specified.

<Measurement of UV Spectrum>

A measurement sample solution was prepared by adding a measurement sample to acetonitrile (Wako Pure Chemical Industries, Ltd.) so that the concentration became to be 10 ppm and completely dissolving it. The sample solution was put into a quartz cell having an optical path length of 1 cm up to the height of about eight tenths so as not to generate bubbles, and set on UV2600 (manufactured by Shimadzu Corporation), whereupon the UV spectrum was measured.

(Example 1) Decomposition Inhibition Experiment of Alkoxyanthracene 9,10-Dibutoxyanthracene (DBA) was added to 1-methyl-2-pyrrolidone (manufactured by Tokyo Chemical Industry Co., Ltd) in an amount of 1 wt %, and, as a singlet oxygen quencher, triethylenediamine was added in an amount of 5 wt %. This solution was put into a stainless steel cup and covered with a PET film and quartz glass. This was put into a light resistance tester (Atlas Suntest CPS+, manufactured by Toyo Seiki Seisaku-sho, Ltd.) and irradiated with light for 4 hours. Then, the amount of 9,10-dibutoxyanthracene (DBA) before and after the light irradiation was quantified by high performance liquid chromatography, and the residual proportion of 9,10-dibutoxyanthracene (DBA) after 4 hours was calculated. The results are shown in Table 2.

Examples 2, 3 and Comparative Example 1

Irradiation with light was carried out in the same manner as in Example 1 except that in place of triethylenediamine, as a singlet oxygen quencher, the compound in Table 1 was added in the amount in Table 1, and the residual proportion of 9,10-dibutoxyanthracene (DBA) was calculated. The results are shown in Table 2.

Example 4

Irradiation with light was carried out in the same manner as in Example 1 except that, in addition to the singlet oxygen quencher, further as an antioxidant, ADK STAB AO-40 (manufactured by ADEKA Corporation, ADK STAB is a registered trademark of ADEKA Corporation) was added in an amount of 5 wt %, and the residual proportion of 9,10-dibutoxyanthracene (DBA) was calculated. The results are shown in Table 2.

TABLE 1

| | Residual proportion of DBA (%) | | | | |
|---|---|---|---|---|---|
| | Example 1 | Example 2 | Example 3 | Example 4 | Comparative Example 1 |
| Singlet oxygen quencher (Addition amount) | TEDA (5 wt %) | DMF (5 wt %) | FFA (5 wt %) | TEDA (5 wt %) | Nil |
| Antioxidant (Addition amount) | Nil | Nil | Nil | AO-40 (5 wt %) | Nil |

TEDA: triethylene diamine
DMF: 2,5-dimethylfuran
FFA: furfuryl alcohol
AO-40: ADK STAB AO-40 (phenolic antioxidant)

TABLE 2

| | Residual proportion of DBA (%) | | | | |
|---|---|---|---|---|---|
| Light irradiation time (hr) | Example 1 | Example 2 | Example 3 | Example 4 | Comparative Example 1 |
| 0 | 100 | 100 | 100 | 100 | 100 |
| 4 | 84.5 | 44.1 | 23.0 | 94.4 | 3.7 |

As is evident from Table 2, in the case of Comparative Example 1 in which no singlet oxygen quencher was added, the residual proportion of DBA after 4 hours was 3.7%, which means that most of DBA was decomposed. Whereas, in the case of Example 1 in which triethylenediamine (TEDA) being a singlet oxygen quencher, was added, the residual proportion of DBA was extremely high. Further, as is evident from Example 4, by the combined use of ADK STAB AO-40 being an antioxidant and triethylenediamine (TEDA) being a singlet oxygen quencher, it is evident that the residual proportion became further higher. Also in the cases of Examples 2 and 3 where the furan compound being a singlet oxygen quencher, was added, it is evident that there is a certain effect of suppressing the decomposition of DBA. From these results, it is understood that by capturing singlet oxygen, it is possible to suppress decomposition of the alkoxyanthracene compound.

<Preparation of Polymer and Measurement of YI Value>

A radical polymer was prepared as follows. First, a polyethylene terephthalate (PET) film (length 18 mm×width 1 mm×thickness 0.1 mm) was placed as a spacer on both ends of a cover glass (length 18 mm×width 18 mm×thickness 0.16 mm). An appropriate amount of a radically polymerizable composition was dropped between the PET films on the cover glass, and another cover glass was covered. Thus, the radically polymerizable composition adjusted to the thickness of the PET film was obtained in a state of being sandwiched between two cover glasses. This was irradiated with ultraviolet rays (365 nm light was 55.2 mW/cm$^2$) for 5 minutes using a high-pressure mercury lamp light irradiator (Eye Cure Light 1.5 kW manufactured by Eye Graphics Co., Ltd., irradiation from a height of 13.2 cm) to obtain a polymer.

The obtained polymer was immediately measured for transmittance at from 190 to 800 nm by an ultraviolet-visible spectrophotometer (UV-2600 manufactured by Shimadzu Corporation), and the YI value was calculated by using a color measurement software.

(Example 5) Coloring Suppression Experiment of Cured Product

To 100 parts by weight of trimethylolpropane triacrylate (TMPTA) (manufactured by Tokyo Chemical Industry Co., Ltd.) as a radically polymerizable compound, Irgacure 184 (1-hydroxycyclohexyl phenyl ketone manufactured by BASF, Irgacure is a registered trademark of BASF) as a photoradical polymerization initiator, was added in an amount of 3.0 parts by weight, 9,10-dibutoxyanthracene (DBA) as a photoradical polymerization sensitizer, was added in an amount of 0.5 parts by weight, and further, triethylenediamine as a singlet oxygen quencher was added in an amount of 1.0 parts by weight, to prepare a photoradical polymerizable composition. The photoradical polymerizable composition was irradiated with ultraviolet rays for 5 minutes by a high pressure mercury lamp to prepare a radical polymer. The transmittance was immediately measured, and the YI value was calculated. As a result, the YI value was 14.02 (described in Table 3).

Example 6

Carried out in the same manner as in Example 5 except that the amount of triethylenediamine added was changed to 5.0 parts by weight. As a result, the YI value was 11.18 (described in Table 3).

Comparative Example 2

Carried out in the same manner as in Example 5 except that triethylenediamine was not added. As a result, the YI value was 16.13 (described in Table 3).

Example 7

To 100 parts by weight of trimethylolpropane triacrylate (TMPTA) (manufactured by Tokyo Chemical Industry Co., Ltd.) as a radically polymerizable compound, Irgacure 250 (4-isobutylphenyl-4'-methylphenyl iodonium hexafluorophosphate, manufactured by BASF, Irgacure is a registered trademark of BASF) as a photoradical polymerization initiator was added in an amount of 4.0 parts by weight, and 9,10-dibutoxyanthracene (DBA) as a photoradical polymerization sensitizer was added in an amount of 0.5 parts by weight, and further, triethylenediamine as a singlet oxygen quencher was added in an amount of 1.0 part by weight, to prepare a photoradical polymerizable composition. The photoradical polymerizable composition was irradiated with ultraviolet rays for 5 minutes by a high pressure mercury lamp to prepare a radical polymer. The transmittance was immediately measured, and the YI value was calculated. As a result, the YI value was 15.25 (described in Table 3).

Comparative Example 3

Carried out in the same manner as in Example 7 except that triethylenediamine was not added. As a result, the YI value was 17.02 (described in Table 3).

TABLE 3

| | Photoradical polymerization initiator (Addition amount: parts by weight) | Photoradical sensitizer (Addition amount: parts by weight) | Singlet oxygen quencher (Addition amount: parts by weight) | YI value |
|---|---|---|---|---|
| Example 5 | Irgacure 184 (3.0) | DBA (0.5) | TEDA (1.0) | 14.02 |
| Example 6 | | | TEDA (5.0) | 11.18 |
| Comparative Example 2 | | | Nil | 16.13 |
| Example 7 | Irgacure 250 (4.0) | | TEDA (1.0) | 15.25 |
| Comparative Example 3 | | | Nil | 17.02 |

As is evident by comparison between Example 5 and Comparative Example 2 and between Example 7 and Comparative Example 3, it is seen that by adding a singlet oxygen quencher to the photoradical polymerizable composition containing the anthracene photoradical sensitizer, it is possible to suppress coloring of the radical polymer. This is because the anthracene-type sensitizer changes dissolved oxygen and oxygen in the surface layer of the photoradical composition to singlet oxygen (oxygen in an excited state), and this singlet oxygen promotes decomposition of the anthracene-type sensitizer to form a colored decomposition product, but, by adding a singlet oxygen quencher to the photoradical polymerizable composition, the decomposition reaction of the anthracene-type sensitizer is suppressed, and the formation of a colored decomposition product derived from DBA is prevented. Further, by comparison between Example 5 and Example 6, it is evident that by adding a singlet oxygen quencher in a large amount, singlet oxygen is more efficiently captured, decomposition of the anthracene-type sensitizer is further suppressed, and coloring of the cured product is suppressed.

INDUSTRIAL APPLICABILITY

The photopolymerization sensitizer composition of the present invention comprising the photopolymerization sensitizer containing the alkoxyanthracene compound represented by the formula (1) and the singlet oxygen quencher, is sensitive to light having a wavelength range of from 300 nm to 500 nm, and is useful as a radical polymerization sensitizer composition to activate a radical polymerization initiator. Further, the photopolymerization sensitizer composition of the present invention is a photopolymerization sensitizer composition very useful in the industry, which is capable of suppressing formation of a colored decomposed product derived from an alkoxyanthracene compound represented by the general formula (1) when exposed to light and which is capable of suppressing coloring of the cured product obtained by polymerizing a photopolymerizable composition containing the photopolymerization sensitizer composition.

The invention claimed is:

1. A photopolymerization sensitizer, composition comprising:
a photopolymerization sensitizer comprising an alkoxyanthracene compound and
a singlet oxygen quencher, characterized in that the singlet oxygen quencher is trimethylamine, triethylamine, diethyl(2-hydroxyethyl)amine, diethyl(2-methoxyethyl)amine, diethyl(2-cyanoethyl)amine, diethyl(7-aminoheptyl)amine, tributylamine, di(2-hydroxyethyl)-t-butylamine, Tröger's base, 1-methylpiperidine, 4-hydroxy-1,2,2,6,6-pentamethylpiperidine, 1-cyclohexylpiperidine, quinuclidine, piperazine, 1,4-diazabicyclo[2.2.2]octane, furan, 2-methylfuran, furfurylamine, 2-methoxyfuran, furfuryl alcohol, furfuryl methyl ether, 2-furoic acid, 2-vinylfuran, α-methyl furfuryl alcohol, α-benzyl furfuryl alcohol, α-phenylethyl furfuryl alcohol, α-(3-phenylpropyl) furfuryl alcohol, α-benzhydryl furfuryl alcohol, a,α-diphenyl furfuryl alcohol, 2-acetylfuran, N-methyl furfuryl amine, 2-phenylfuran, 3-phenylfuran, 3-(4'-fluorophenyl)furan, 2-(4'-chlorophenyl)furan, 3-(4'-bromophenyl)furan, 2-(4'-methylphenyl)furan, 3-(4'-methylphenyl)furan, 2-(4'-methoxyphenyl)furan, 3-(4'-methoxyphenyl)furan, 2,4-dimethylfuran, 2,5-dimethylfuran, 2,5-diphenylfuran, 3,4-diphenylfuran, 2,3,4,5-tetraphenylfuran, 2,2(2,5)furanophane, isobenzofuran, 1,3-diphenylisobenzofuran, 1,3-diphenyl-5,6-dimethylisobenzofuran, 1,3,4,7-tetraphenylisobenzofuran, or 1,3,4,5,6,7-hexaphenylisobenzofuran,
wherein the alkoxyanthracene compound is a compound of formula (1):

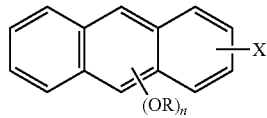

(1)

wherein n represents an integer of 1 or 2, R represents a $C_{1-12}$ alkyl group, and X represents a hydrogen atom or a $C_{1-8}$ alkyl group.

2. A photopolymerization sensitizer composition, comprising:
a radical polymerization sensitizer comprising an alkoxyanthracene compound and
a singlet oxygen quencher, characterized in that the singlet oxygen quencher is trimethylamine, triethylamine, diethyl(2-hydroxyethyl)amine, diethyl(2-methoxyethyl)amine, diethyl(2-cyanoethyl)amine, diethyl(7-aminoheptyl)amine, tributylamine, di(2-hydroxyethyl)-t-butylamine, Tröger's base, 1-methylpiperidine, 4-hydroxy-1,2,2,6,6-pentamethylpiperidine, 1-cyclohexylpiperidine, quinuclidine, piperazine, 1,4-diazabicyclo[2.2.2]octane, furan, 2-methylfuran, furfurylamine, 2-methoxyfuran, furfuryl alcohol, furfuryl methyl ether, 2-furoic acid, 2-vinylfuran, α-methyl furfuryl alcohol, α-benzyl furfuryl alcohol, α-phenylethyl furfuryl alcohol, α-(3-phenylpropyl) furfuryl alcohol, α-benzhydryl furfuryl alcohol, a,α-diphenyl furfuryl alcohol, 2-acetylfuran, N-methyl furfuryl amine, 2-phenylfuran, 3-phenylfuran, 3-(4'-fluorophenyl)furan, 2-(4'-chlorophenyl)furan, 3-(4'-bromophenyl)furan, 2-(4'-methylphenyl)furan, 3-(4'-methylphenyl)furan, 2-(4'-methoxyphenyl)furan, 3-(4'-methoxyphenyl)furan, 2,4-dimethylfuran, 2,5-dimethylfuran, 2,5-diphenylfuran, 3,4-diphenylfuran, 2,3,4,5-tetraphenylfuran, 2,2(2,5)furanophane, isobenzofuran, 1,3-diphenylisobenzofuran, 1,3-diphenyl-5,6-dimethylisobenzofuran, 1,3,4,7-tetraphenylisobenzofuran, or 1,3,4,5,6,7-hexaphenylisobenzofuran,
wherein the alkoxyanthracene compound is a compound of formula (2):

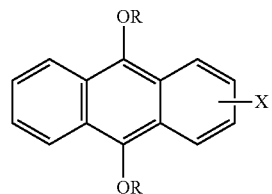

(2)

wherein R represents a $C_{1-12}$ alkyl group, and X represents a hydrogen atom or a $C_{1-8}$ alkyl group.

3. A photopolymerization sensitizer composition, comprising:
a radical polymerization sensitizer comprising an alkoxyanthracene compound and
a singlet oxygen quencher, characterized in that the singlet oxygen quencher is trimethylamine, triethylamine, diethyl(2-hydroxyethyl)amine, diethyl(2-methoxyethyl)amine, diethyl(2-cyanoethyl)amine, diethyl(7-aminoheptyl)amine, tributylamine, di(2-hydroxyethyl)-t-butylamine, Tröger's base, 1-methylpiperidine, 4-hydroxy-1,2,2,6,6-pentamethylpiperidine, 1-cyclohexylpiperidine, quinuclidine, piperazine, 1,4-diazabicyclo[2.2.2]octane, furan, 2-methylfuran, furfurylamine, 2-methoxyfuran, furfuryl alcohol, furfuryl methyl ether, 2-furoic acid, 2-vinylfuran, α-methyl furfuryl alcohol, α-benzyl furfuryl alcohol, α-phenylethyl furfuryl alcohol, α-(3-phenylpropyl) furfuryl alcohol, α-benzhydryl furfuryl alcohol, a,α-diphenyl furfuryl alcohol, 2-acetylfuran, N-methyl furfuryl amine, 2-phenylfuran, 3-phenylfuran, 3-(4'-fluorophenyl)furan, 2-(4'-chlorophenyl)furan, 3-(4'-bromophenyl)furan, 2-(4'-methylphenyl)furan, 3-(4'-methylphenyl)furan, 2-(4'-methoxyphenyl)furan, 3-(4'-methoxyphenyl)furan, 2,4-dimethylfuran, 2,5-dimethylfuran, 2,5-diphenylfuran, 3,4-diphenylfuran, 2,3,4,5-tetraphenylfuran, 2,2(2,5)furanophane, isobenzofuran, 1,3-diphenylisobenzofuran, 1,3-diphenyl-5,6-dimethylisobenzofuran, 1,3,4,7-tetraphenylisobenzofuran, or 1,3,4,5,6,7-hexaphenylisobenzofuran,
wherein the alkoxyanthracene compound of a compound of formula (3):

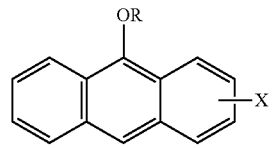

(3)

wherein R represents a $C_{1-12}$ alkyl group, and X represents a hydrogen atom or a $C_{1-8}$ g alkyl group.

4. The photopolymerization sensitizer composition according to claim 1, further comprising an antioxidant together with the singlet oxygen quencher.

5. The photopolymerization sensitizer composition according to claim 1, wherein the singlet oxygen quencher is 1,4-diazabicyclo[2.2.2]octane.

6. A photopolymerizable composition, comprising:
the photopolymerization sensitizer composition of claim 1,
a photopolymerization initiator and
a polymerizable compound.

7. The photopolymerizable composition according to claim 6, wherein a triarylmethane dye is not contained in the photopolymerizable composition.

8. The photopolymerizable composition according to claim 6, wherein the polymerizable compound is a radical polymerizable compound, and the photopolymerization initiator is a photoradical polymerization initiator.

9. The photopolymerizable composition according to claim 6, wherein the polymerizable compound is a cationic polymerizable compound, and the photopolymerization initiator is a photocationic polymerization initiator.

10. The photopolymerizable composition according to claim 6, wherein the polymerizable compound comprises both a radical polymerizable compound and a cationic polymerizable compound, and the photopolymerization initiator comprises both a photoradical polymerization initiator and a photocationic polymerization initiator.

11. A photopolymerization method, comprising:
polymerizing the photopolymerizable composition of claim 6 by irradiating the photopolymerizable composition with light comprising a light in a wavelength range of from 300 nm to 500 nm.

12. The photopolymerization method according to claim 11, wherein the irradiation source of the light comprising the light in a wavelength range of from 300 nm to 500 nm is an ultraviolet LED having a central wavelength of 375 nm, 385 nm, 395 nm or 405 nm, or a 405 nm semiconductor laser.

* * * * *